United States Patent
Luo et al.

(10) Patent No.: US 12,081,334 B2
(45) Date of Patent: Sep. 3, 2024

(54) METHOD EXECUTED BY USER EQUIPMENT, AND USER EQUIPMENT

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN); Tomoki Yoshimura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 476 days.

(21) Appl. No.: 17/423,605

(22) PCT Filed: Jan. 16, 2020

(86) PCT No.: PCT/CN2020/072410
§ 371 (c)(1),
(2) Date: Jul. 16, 2021

(87) PCT Pub. No.: WO2020/147775
PCT Pub. Date: Jul. 23, 2020

(65) Prior Publication Data
US 2022/0116143 A1    Apr. 14, 2022

(30) Foreign Application Priority Data
Jan. 17, 2019  (CN) .......................... 201910047349.3

(51) Int. Cl.
*H04L 1/00* (2006.01)
*H04L 5/00* (2006.01)
*H04W 72/23* (2023.01)

(52) U.S. Cl.
CPC .......... *H04L 1/0091* (2013.01); *H04L 1/0023* (2013.01); *H04L 1/0079* (2013.01); *H04L 5/0053* (2013.01); *H04W 72/23* (2023.01)

(58) Field of Classification Search
CPC ... H04L 1/0023; H04L 1/0079; H04L 1/0091; H04L 5/0053; H04W 72/23
See application file for complete search history.

(56) References Cited

U.S. PATENT DOCUMENTS 10,512,072 B2 * 12/2019 Yi ........................ H04W 72/542
10,841,911 B2 * 11/2020 Park ...................... H04L 5/0053
(Continued)

FOREIGN PATENT DOCUMENTS

| CN | 103796315 A | 5/2014 |
| CN | 105553622 A | 5/2016 |

(Continued)

*Primary Examiner* — Alpus Hsu
(74) *Attorney, Agent, or Firm* — ScienBiziP, P.C.

(57) ABSTRACT

A method performed by a UE is provided. The method determines a first size of a first DCI format and a second size of a second DCI format monitored in a common search space (CSS). The method determines a third size of the first DCI format and a fourth size of the second DCI format monitored in a USS. The method aligns the first size with the second size, and aligns the third size with the fourth size. The method determines at least one of a size of a third DCI format and a size of a fourth DCI format monitored in the USS, and adjusts at least one of the determined sizes of the third and fourth DCI formats, such that the adjusted size is not equal to any of the aligned first size, the aligned second size, the aligned third size, or the aligned fourth size.

11 Claims, 3 Drawing Sheets

(56) References Cited

U.S. PATENT DOCUMENTS

| | | | |
|---|---|---|---|
| 2020/0120650 A1* | 4/2020 | Yi | H04W 72/542 |
| 2021/0067267 A1* | 3/2021 | Chen | H04L 1/0027 |
| 2021/0160035 A1* | 5/2021 | Kittichokechai | H04W 72/23 |
| 2021/0368509 A1* | 11/2021 | Lin | H04L 5/0053 |
| 2021/0400702 A1* | 12/2021 | Parkvall | H04W 72/23 |

FOREIGN PATENT DOCUMENTS

| | | |
|---|---|---|
| CN | 109089316 A | 12/2018 |
| WO | 2012/043955 A1 | 4/2012 |

* cited by examiner

METHOD EXECUTED BY USER EQUIPMENT, AND USER EQUIPMENT

CROSS-REFERENCE TO RELATED APPLICATION(S)

This present disclosure is a national stage application of International Patent Application PCT/CN2020/072410, filed on Jan. 16, 2020, now published as WO2020/147775, which claims the benefit of and priority to Chinese Patent Application Serial No. 201910047349.3, filed on Jan. 17, 2019, the contents of all of which are hereby incorporated fully by reference into the present disclosure.

FIELD

The present invention relates to the technical field of wireless communication, and more particularly, to a method executed by a user equipment and a corresponding user equipment.

BACKGROUND

At the 3rd Generation Partnership Project (3GPP) RAN #71 plenary meeting held in March 2016, a new study item related to 5G technical standards was approved (see NPL 1). The objective of this study item is to develop a new radio (NR) access technology to meet all 5G application scenarios, requirements, and deployment environments. The NR includes three main application scenarios: eMBB (Enhanced Mobile Broadband), mMTC (massive Machine Type Communication), and URLLC (Ultra-Reliable and Low Latency Communications). At the 3rd Generation Partnership Project (3GPP) RAN #75 plenary meeting held in June 2017, work items corresponding to 5G NR were approved (see NPL 2).

In the 5G system, downlink transmission on a PDSCH (Physical Downlink Shared Channel) and uplink transmission on a PUSCH (Physical Uplink Shared Channel) are scheduled via DCI (Downlink Control Information).

The 5G system supports a variety of DCI formats as shown in Table 1. After each DCI format is channel coded, its CRC may be scrambled with an RNTI (Radio-Network Temporary Identifier) to indicate a specific purpose and/or one or more target UEs. For example, the CRC of DCI format used to indicate paging may be scrambled with P-RNTI.

TABLE 1

DCI formats supported by 5G

| DCI Format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC (Transmit Power Control) commands for PUCCH and PUSCH |
| 2_3 | Transmission of a group of TPC commands for SRS transmission by one or more UEs |

The DCI of 5G is carried on PDCCH (Physical Downlink Control Channel). One PDCCH is composed of one or more CCEs (Control-Channel Elements), one CCE is composed of a plurality of (e.g., 6) REGs (Resource-Element Groups), and the REG is defined in a CORESET (Control-Resource Set). A CORESET includes a plurality of resource blocks in frequency domain (with each resource block including 12 consecutive subcarriers in frequency domain) and includes one or more (e.g., 1, or 2, or 3) OFDM symbols in time domain.

The UE monitors PDCCH transmissions of a base station on one or more search space sets, where each search space set may correspond to a set of PDCCH candidates. The UE determines whether there is a PDCCH transmitted to itself by performing blind detection at the time and frequency positions of the PDCCH candidates to be monitored.

The search space set can be divided into a CSS (Common Search Space) set and a USS (UE-Specific Search Space) set, for example:

Type 0-PDCCH CSS set. For example, this CCS set is configured by a parameter pdcch-ConfigSIB1 in MIB or by a parameter searchSpaceSIB1 in PDCCH-ConfigCommon IE or by a parameter searchSpaceZero in PDCCH-ConfigCommon IE. The CRC of a corresponding DCI format may be scrambled with SI-RNTI.

Type 0A-PDCCH CSS set. For example, this CCS set is configured by a parameter searchSpaceOtherSystemInformation in PDCCH-ConfigCommon IE. The CRC of a corresponding DCI format may be scrambled with SI-RNTI.

Type 1-PDCCH CSS set. For example, this CCS set is configured by a parameter ra-SearchSpace in PDCCH-ConfigCommon IE. The CRC of a corresponding DCI format may be scrambled with RA-RNTI or TC-RNTI.

Type 2-PDCCH CSS set. For example, this CCS set is configured by a parameter pagingSearchSpace in PDCCH-ConfigCommon IE. The CRC of a corresponding DCI format may be scrambled with P-RNTI.

Type 3-PDCCH CSS set. For example, this CSS set is configured by parameters searchSpacesToAddModList and searchSpacesToReleaseList in PDCCH-Config IE, and its result is one or more Type 3-PDCCH CSSs configured by SearchSpace IE, wherein a parameter searchSpaceType of each Type 3-PDCCH CSS is configured to be common. The CRC of a corresponding DCI format may be scrambled with INT-RNTI, SFI-RNTI, TPC-PUSCH-RNTI, TPC-PUCCH-RNTI, TPC-SRS-RNTI, C-RNTI, MCS-C-RNT, or CS-RNTI.

USS set. For example, this USS set is configured by parameters searchSpacesToAddModList and searchSpacesToReleaseList in PDCCH-Config IE, and its result is one or more USSs configured by SearchSpace 1E, wherein a parameter searchSpaceType of each USS is configured to be ue-Specific. The CRC of a corresponding DCI format may be scrambled with C-RNTI, MCS-C-RNTI, SP-CSI-RNTI, or CS-RNTI.

The UE needs to assume a DCI size when performing blind detection on a PDCCH candidate. Due to the limitation of processing capability, the UE can only monitor a certain number of DCI sizes in each slot. Table 2 summarizes classified search space set types, their corresponding DCI formats, and RNTIs for scrambling DCI CRC according to DCI sizes. Herein:

All rows of the same "DCI size category" (e.g., all search space set types, DCI formats, and RNTIs corresponding to 1_0_css) correspond to the same DCI size.

The column "DCI size" is just an example listing possible DCI sizes. For some DCI formats, an actual DCI size depends on system configuration information and/or UE specific configuration information.

DCI formats associated with a given USS set can only be 0_0 and 1_0, or 0_1 and 1_1.

The search space set type, DCI format, and RNTI (for some DCI formats) actually monitored by a UE depend on system configuration information and/or UE specific configuration information.

FDRA (Frequency Domain Resource Assignment) is a field defined in some of the DCI formats, and the size of this field depends on configuration information related to a frequency domain resource assignment. For example, in DCI formats 1_0 and 1_1, the size of the FDRA is related to $N_{RB}^{DL,BWP}$ (for example, the size of the FDRA may be $\lceil \log_2(N_{RB}^{DL,BWP}(N_{RB}^{DL,BWP}+1)/2) \rceil$ bits); and in DCI formats 0_0 and 0_1, the size of the FDRA is related to $N_{RB}^{UL,BWP}$, wherein the values of $N_{RB}^{DL,BWP}$ and $N_{RB}^{UL,BWP}$ depend on the DCI formats and corresponding search space set type thereof and may be adjusted to satisfy a limit on the DCI size.

The search space sets, DCI formats and RNTIs configured by a network for the UE must satisfy all the following conditions:

The number of different DCI sizes configured for the UE in a cell cannot exceed 4.

The number of different DCI sizes for C-RNTIs configured for the UE in a cell cannot exceed 3.

The size of 0_0_uss cannot be equal to the size of 0_1_uss.

The size of 1_0_uss cannot be equal to the size of 1_1_uss.

In order to satisfy the limit on the DCI size, a DCI size alignment process is defined in the existing 3GPP standard specifications related to 5G as follows:

Step 0 (determine 0_0_css and 1_0_css and align the size of 0_0_css to the size of 1_0_css):

Determine 0_0_css. Herein:

The size of the frequency domain resource assignment field in DCI format 0_0 is related to $N_{RB}^{UL,BWP}$ (e.g., the size of the frequency domain resource assignment field is $\lceil \log_2 (N_{RB}^{UL,BWP} (N_{RB}^{UL,BWP}+1)/2) \rceil$ bits) and $N_{RB}^{UL,BWP}$ is equal to the size of an initial uplink BWP (which is configured, for example, via a parameter initialUplinkBWP).

The size of the 0_0_css does not include padding bits.

Determine 1_0_css. Herein:

The size of the frequency domain resource assignment field in DCI format 1_0 is related to $N_{RB}^{DL,BWP}$ (e.g., the size of the frequency domain resource assignment field is $\lceil \log_2(N_{RB}^{DL,BWP} (N_{RB}^{DL,BWP}+1)/2) \rceil$ bits). If a CORESET 0 is configured in a cell, $N_{RB}^{BWP}$ is equal to the size of the CORESET 0; and if the CORESET 0 is not configured in the cell, $N_{RB}^{DL,BWP}$ is equal to the size of an initial downlink BWP (which is configured, for example, via a parameter initialDownlinkBWP).

If the UE is configured to monitor a DCI format 0_0 in a CSS and the number of information bits of the 0_0_css before being padded is smaller than the payload size of the 1_0_css used to schedule the same serving cell, then perform zero padding on the 0_0_css until the payload size of the 0_0_css is equal to the payload size of the 1_0_css.

TABLE 2 correspondences among search space set types, DCI formats and sizes, and RNTIs

| DCI size category | Search Space Set Type | DCI Format | RNTI | DCI Size |
|---|---|---|---|---|
| 1_0_css | Type 0-PDCCH CSS | 1_0 | SI-RNTI | 28 + FDRA |
|  | Type 0A-PDCCH CSS | 1_0 | SI-RNTI | 28 + FDRA |
|  | Type 1-PDCCH CSS | 1_0 | RA-RNTI TC-RNTI | 28 + FDRA |
|  | Type 2-PDCCH CSS | 1_0 | P-RNTI | 28 + FDRA |
|  | Type 3-PDCCH CSS | 1_0 | C-RNTI MCS-C-RNTI CS-RNTI | 28 + FDRA |
| 1_0_uss | USS | 1_0 | C-RNTI MCS-C-RNTI CS-RNTI | 28 + FDRA |
| 0_0_css | Type 1-PDCCH CSS | 0_0 | TC-RNTI | 21 + FDRA |
|  | Type 3-PDCCH CSS | 0_0 | C-RNTI MCS-C-RNTI CS-RNTI | 21 + FDRA |
| 0_0_uss | USS | 0_0 | C-RNTI MCS-C-RNTI CS-RNTI | 21 + FDRA |
| 1_1_uss | USS | 1_1 | C-RNTI MCS-C-RNTI CS-RNTI | 62 + FDRA |
| 0_1_uss | USS | 0_1 | C-RNTI MCS-C-RNTI CS-RNTI SP-CSI-RNTI | 68 + FDRA |
|  | Type 3-PDCCH CSS | 2_0 | SFI-RNTI | 128 |
|  | Type 3-PDCCH CSS | 2_1 | INT-RNTI | 126 |
|  | Type 3-PDCCH CSS | 2_2 | TPC-PUSCH-RNTI TPC-PUCCH-RNTI | Padding 0 to be aligned with the size of 1_0_css |
|  | Type 3-PDCCH CSS | 2_3 | TPC-SRS-RNTI | Padding 0 to be aligned with the size of 1_0_css |

If the UE is configured to monitor a DCI format 0_0 in a CSS and the number of information bits of the 0_0_css before being truncated is larger than the payload size of the 1_0_css used to schedule the same serving cell, then truncate several of the most significant bits at the beginning of the frequency domain resource assignment field in the 0_0_css to reduce the bitwidth of the frequency domain resource assignment field, so that the size of the 0_0_css is equal to the size of the 1_0_css.

Step 1 (determine 0_0_uss and 1_0_uss and align the one with a smaller size to the other with a larger size):

Determine 0_0_uss. Herein:

The size of the frequency domain resource assignment field in DCI format 0_0 is related to $N_{RB}^{UL,BWP}$ (e.g., the size of the frequency domain resource assignment field is $\lceil \log_2(N_{RB}^{UL,BWP}(N_{RB}^{UL,BWP}+1)/2) \rceil$ bits) and $N_{RB}^{UL,BWP}$ is equal to the size of an active uplink BWP.

The size of the 0_0_uss does not include padding bits.

Determine 1_0_uss. Herein:

The size of the frequency domain resource assignment field in DCI format 1_0 is related to $N_{RB}^{DL,BWP}$ (e.g., the size of the frequency domain resource assignment field is $\lceil \log_2 (N_{RB}^{DL,BWP}(N_{RB}^{DL,BWP}+1)) \rceil$ bits). $N_{RB}^{DL,BWP}$ is equal to the size of an active downlink BWP.

If the UE is configured to monitor a DCI format 0_0 in a USS and the number of information bits of the 0_0_uss before being padded is smaller than the payload size of the 1_0_uss used to schedule the same serving cell, then perform zero padding on the 0_0_uss until a payload size of the 0_0_uss is equal to a payload size of the 1_0_uss.

If the UE is configured to monitor a DCI format 1_0 in a USS and the number of information bits of the 1_0_uss before being padded is smaller than the payload size of the 0_0_uss used to schedule the same serving cell, then perform zero padding on the 1_0_uss until a payload size of the 1_0_uss is equal to a payload size of the 0_0_uss.

Step 2 (if necessary, pad the 0_1_uss and/or 1_1_uss with 0(s), so that the size of either of the 0_1_uss and the 1_1_uss is not equal to the size of the 0_0_uss/1_0_uss):

If the size of the 0_1_uss is equal to the size of the 0_0_uss/1_0_uss (the size of the 0_0_uss and the size of the 1_0_uss are equal after Step 1 is performed), then append one zero padding bit after the last field of the 0_1_uss.

If the size of the 1_1_uss is equal to the size of the 0_0_uss/1_0_uss, append one zero padding bit after the last field of the 1_1_uss.

Step 3 (if the limit on the DCI size is satisfied, the process ends):

If both of the following conditions are satisfied, the DCI size alignment process ends:

The number of different DCI sizes configured for the UE in a cell does not exceed 4.

The number of different DCI sizes for C-RNTIs configured for the UE in a cell does not exceed 3.

Step 4 (otherwise, cancel Step 2, re-determine the 1_0_uss and the 0_0_uss, and align the sizes of the 1_0_uss and 0_0_uss to the sizes of the 1_0_css/0_0_css):

Otherwise:

Remove the padding bits (if any) introduced in Step 2.

Determine 1_0_uss. Herein:

The size of the frequency domain resource assignment field in DCI format 1_0 is related to $N_{RB}^{DL,BWP}$ (e.g., the size of the frequency domain resource assignment field is $\lceil \log_2(N_{RB}^{DL,BWP}(N_{RB}^{DL,BWP}+1)/2) \rceil$ bits). If a CORESET 0 is configured in a cell, $N_{RB}^{DL,BWP}$ is equal to the size of the CORESET 0; and if the CORESET 0 is not configured in the cell, $N_{RB}^{DL,BWP}$ is equal to the size of an initial downlink BWP (which is configured, for example, via a parameter initialDownlinkBWP).

Determine 0_0_uss. Herein:

The size of the frequency domain resource assignment field in DCI format 0_0 is related to $N_{RB}^{UL,BWP}$ (e.g., the size of the frequency domain resource assignment field is $\lceil \log_2(N_{RB}^{UL,BWP}(N_{RB}^{BWP}+1)/2) \rceil$ bits) and $N_{RB}^{UL,BWP}$ is equal to the size of an initial uplink BWP (which is configured, for example, via a parameter initialUplinkBWP).

The size of the 0_0_uss does not include padding bits.

If the number of information bits of the 0_0_uss before being padded is smaller than the payload size of the 1_0_uss used to schedule the same serving cell, then perform zero padding on the 0_0_uss until a payload size of the 0_0_uss is equal to a payload size of the 1_0_uss.

If the number of information bits of the 0_0_uss before being truncated is larger than the payload size of the 1_0_uss used to schedule the same serving cell, then truncate several of the most significant bits at the beginning of the frequency domain resource assignment field in the 0_0_css to reduce the bitwidth of the frequency domain resource assignment field, so that the size of the 0_0_uss is equal to the size of the 1_0_uss.

In the existing 3GPP standard specifications related to 5G, the mechanism related to DCI size alignment has at least the following problems:

It is not considered that the size of the 1_0_css/0_0_css may be equal to the size of the 1_1_uss or the size of the 0_1_uss after Step 1 or Step 2. As a result, this makes it possible that the UE cannot distinguish between the 1_0_css and the 1_1_uss or between the 0_0_css and the 0_1_uss.

In addition, in the existing 3GPP standard specifications related to 5G, when the UE receives SSBs and/or performs beam indication/beam management/beam failure recovery steps related to the SSBs, the UE may assume that the SSBs with the same index are quasi-collocated in the SSBs transmitted in different SSB periods at the same frequency domain position, but the SSB with different indexes cannot be assumed to be quasi-collocated. This is not a problem for a 5G system deployed at high frequencies (e.g., FR2, frequency range 2); however, when a 5G is deployed at low frequencies (e.g., FR1, frequency range 1), it limits the flexibility of SSB configuration. For example, when a base station does not activate beamforming, all SSBs actually transmitted by the base station may be quasi-collocated, but the UE cannot take any advantage of this feature.

PRIOR ART LITERATURE

Non-Patent Literature

NPL 1: RP-160671, New SID Proposal: Study on New Radio Access Technology

NPL 2: RP-170855, New WID on New Radio Access Technology

SUMMARY

In order to solve at least some of the above problems, the present invention provides a user equipment and a method executed by a user equipment, which can avoid the DCI format ambiguity generated when the UE receives the DCI and can improve the reliability of the downlink control signaling.

The invention provides a method executed by a user equipment UE, and the method comprises: a first step of determining the size of a downlink control information (DCI) format 0_0 monitored in a common search space (CSS) and the size of a DCI format 1_0 monitored in the CSS and aligning the size of the DCI format 0_0 monitored in the CSS with the size of the DCI format 1_0 monitored in the CSS; a second step of determining the size of a DCI format 0_0 monitored in a UE specific search space (USS) and the size of a DCI format 1_0 monitored in the USS and aligning the size of the DCI format 0_0 monitored in the USS with the size of the DCI format 1_0 monitored in the USS; and a third step of determining the size of a DCI format 0_1 monitored in the USS and/or the size of a DCI format 1_1 monitored in the USS and adjusting the determined size of the DCI format 0_1 monitored in the USS and/or the determined size of the DCI format 1_1 monitored in the USS, so that the adjusted size is neither equal to the aligned size of the DCI format 0_0 monitored in the CSS or the aligned size of the DCI format 1_0 monitored in the CSS, nor equal to the aligned size of the DCI format 0_0 monitored in the USS or the aligned size of the DCI format 1_0 monitored in the USS.

Preferably, after the third step, the method further comprises a fourth step of determining whether a first condition and a second condition are satisfied at the same time, wherein the first condition is that a total number of sizes of different DCI formats configured for the UE in a cell does not exceed a first number; and wherein the second condition is that a total number of sizes of different DCI formats for Cell-Radio-Network Temporary Identifiers (C-RNTIs) configured for the UE in the cell does not exceed a second number.

Preferably, when the first condition and the second condition are not satisfied at the same time, the method further comprises: a fifth step of canceling adjusting the size of the DCI format 0_1 monitored in the USS and/or the size of the DCI format 1_1 monitored in the USS in the third step; and a sixth step of re-determining and re-aligning the size of the DCI format 0_0 monitored in the USS with the size of the DCI format 1_0 monitored in the USS, so that the re-aligned size of the DCI format 0_0 monitored in the USS or the re-aligned size of the DCI format 1_0 monitored in the USS is equal to the aligned size of the DCI format 0_0 monitored in the CSS or the aligned size of the DCI format 1_0 monitored in the CSS in the first step.

Preferably, the first step further comprises: if the size of the DCI format 0_0 monitored in the CSS is smaller than the size of the DCI format 1_0 monitored in the CSS, then performing zero padding on the DCI format 0_0 monitored in the CSS to align the size of the DCI format 0_0 monitored in the CSS with the size of the DCI format 1_0 monitored in the CSS; and if the size of the DCI format 0_0 monitored in the CSS is larger than the size of the DCI format 1_0 monitored in the CSS, then truncating one or more most significant bits at the beginning of a frequency domain resource assignment field of the DCI format 0_0 monitored in the CSS to align the DCI format 0_0 monitored in the CSS with the size of the DCI format 1_0 monitored in the CSS.

Preferably, the second step further comprises performing zero padding on a smaller one of the DCI format 0_0 monitored in the USS and the DCI format 1_0 monitored in the USS to align the size of the DCI format 0_0 monitored in the USS with the size of the DCI format 1_0 monitored in the USS.

Preferably, the third step further comprises performing zero padding on the determined DCI format 0_1 monitored in the USS and/or the determined DCI format 1_1 monitored in the USS to adjust the size of the DCI format 0_1 monitored in the USS and/or the size of the DCI format 1_1 monitored in the USS.

In addition, the present invention further provides a method executed by a user equipment (UE), and the method comprises: obtaining configuration information of a first search space set and configuration information of a second search space set, respectively; monitoring a first physical downlink control channel (PDCCH) candidate associated with a first downlink control information (DCI) format configured in the first search space set and a second PDCCH candidate associated with a second DCI format configured in the second search space set according to the obtained configuration information of the first search space set and the obtained configuration information of the second search space set; and decoding only the first PDCCH candidate or only the second PDCCH candidate under a case that a PDCCH priority condition is satisfied.

Preferably, the PDCCH priority condition comprises at least one of a condition related to a control resource set (CORESET), a condition related to a type of a DCI format, a condition related to a size of the DCI format, a condition related to a radio network temporary identity (RNTI), a condition related to PDCCH scrambling, and a condition related to a control channel element (CCE).

Besides, the present invention further provides a user equipment comprising: a processor; and a memory configured to store instructions, wherein the instructions, when executed by the processor, may perform the above-mentioned method.

Invention Effect

According to the present invention, the DCI format ambiguity generated when the UE receives the DCI can be avoided, and the reliability of downlink control signaling can be improved.

BRIEF DESCRIPTION OF THE DRAWINGS

The above and other features of the present invention will become more apparent with the following detailed description in conjunction with the accompanying drawings.

DETAILED DESCRIPTION OF THE PREFERRED EMBODIMENTS

Figure 1:
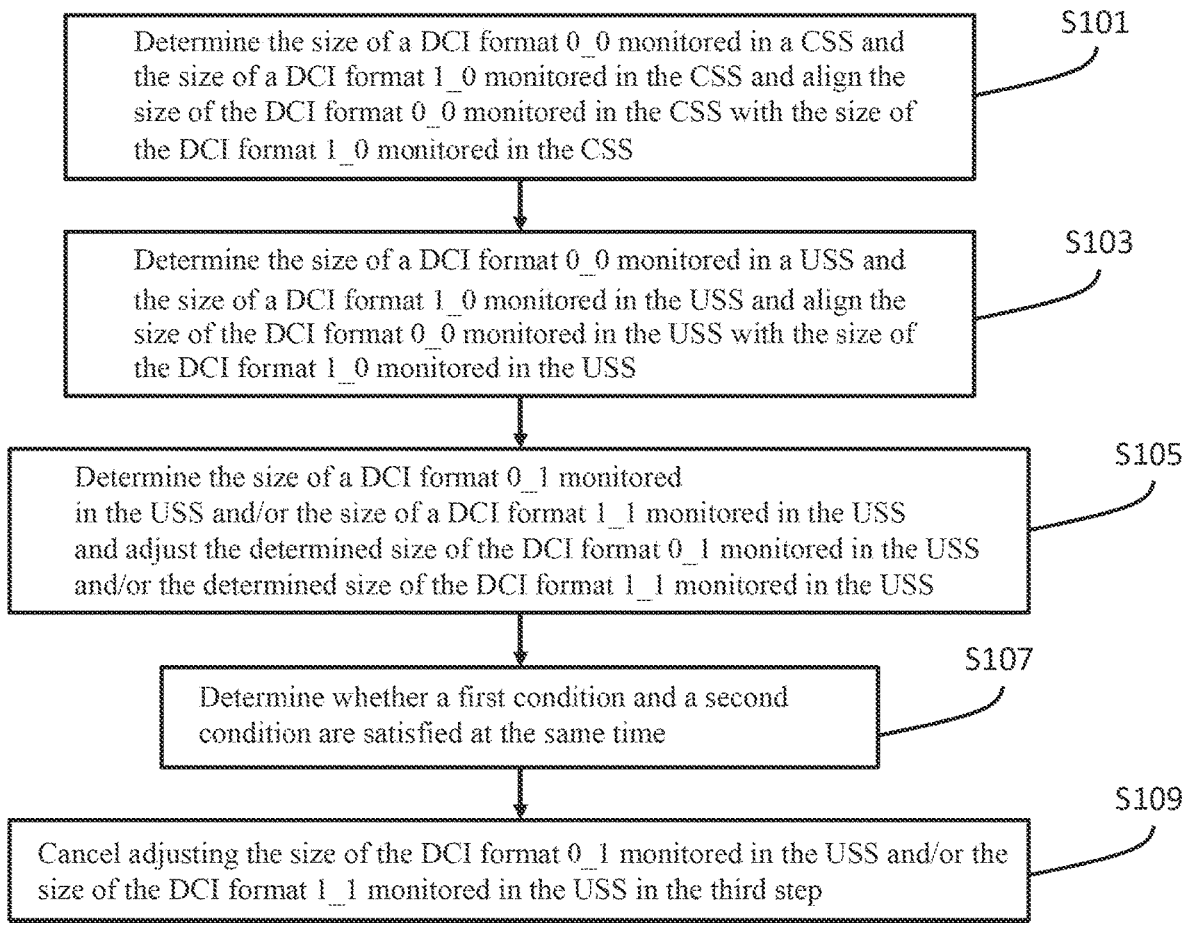
FIG. 1 shows a flowchart of a method executed by a user equipment according to a first embodiment of the present invention.

The present invention will be described in detail with reference to the accompanying drawings and specific implementations. It should be noted that the present invention should not be limited to the specific embodiments described below. In addition, for the sake of simplicity, detailed descriptions of well-known technologies that are not directly related to the present invention are omitted in order to prevent confusion in understanding the present invention.

A plurality of embodiments according to the present invention are specifically described below by adopting a 5G mobile communication system and its subsequent evolved versions as exemplary application environments. However, it should be noted that the present invention is not limited to the following embodiments but may be applied to more other wireless communication systems, such as a communication system later than 5G and a 4G mobile communication system earlier than the 5G.

Some terms involved in the present invention are described below. Unless otherwise specified, the terms used in the present invention adopt the definitions herein. The terms given in the present invention may be named differently in LTE, LTE-Advanced, LTE-Advanced Pro, NR, and later communication systems, but unified terms are adopted in the present invention. When applied to a specific system, the terms may be replaced with terms adopted in the corresponding system.

3GPP: 3rd Generation Partnership Project
BWP: Bandwidth Part
CA: Carrier Aggregation
CCE: Control-Channel Element
CORESET: Control-Resource Set
CP: Cyclic Prefix
CP-OFDM: Cyclic Prefix Orthogonal Frequency Division Multiplexing
CRC: Cyclic Redundancy Check
CSS: Common Search Space
DC: Dual Connectivity
DCI: Downlink Control Information
DFT-s-OFDM: Discrete Fourier Transformation Spread Orthogonal Frequency Division Multiplexing
DL: Downlink
DL-SCH: Downlink Shared Channel
DMRS: Demodulation Reference Signal
eMBB: Enhanced Mobile Broadband
FDRA: Frequency Domain Resource Assignment
IE: Information Element
LCID: Logical Channel ID
LTE-A: Long Term Evolution-Advanced
MAC: Medium Access Control
MAC CE: MAC Control Element
MCG: Master Cell Group
MIB: Master Information Block
mMTC: massive Machine Type Communication
NR: New Radio
NUL: Normal Uplink
OFDM: Orthogonal Frequency Division Multiplexing
PBCH: Physical Broadcast Channel
PDCCH: Physical Downlink Control Channel
PDSCH: Physical Downlink Shared Channel
PRB: Physical Resource Block
PSS: Primary Synchronization Signal
PSSS: Primary Sidelink Synchronization Signal
PTAG: Primary Timing Advance Group
PUSCH: Physical Uplink Shared Channel
PUCCH: Physical Uplink Control Channel
QCL: Quasi co-location
RAR: Random Access Response
RB: Resource Block
RE: Resource Element
REG: Resource-Element Group
RNTI: Radio Network Temporary Identifier
RRC: Radio Resource Control
SCG: Secondary Cell Group
SCS: Subcarrier Spacing
SFN: System Frame Number
SIB: System Information Block
SpCell: Special Cell
SRS: Sounding Reference Signal
SSB: SS/PBCH block
SSS: Secondary Synchronization Signal
STAG: Secondary Timing Advance Group
SUL: Supplementary Uplink
TA: Timing Advance
TAG: Timing Advanced Group
TDD: Time Division Duplexing
TPC: Transmit power control
UE: User Equipment
UL: Uplink
URLLC: Ultra-Reliable and Low Latency Communication
USS: UE-specific Search Space Unless otherwise specified, in all the embodiments and implementations of the present invention:

The size of a DCI format (e.g., DCI format 0_0 monitored in a CSS, DCI format 1_0 monitored in a CSS, DCI format 0_0 monitored in a USS, DCI format 1_0 monitored in a USS, DCI format 0_1 monitored in a USS, or DCI format 1_1 monitored in a USS) may also be referred to as the payload size of the DCI format.

The uplink carrier (UL carrier or non-SUL carrier) may be configured by, for example, a parameter uplinkConfigCommon in the ServingCellConfigCommon IE and/or a parameter uplinkConfigCommon in the ServingCellConfigCommonSIB IE, and/or a parameter uplinkConfig in the ServingCellConfig IE, and/or other parameters.

The supplementary uplink carrier (SUL carrier) may be configured by, for example, a parameter supplementaryUplinkConfig in the ServingCellConfigCommon IE and/or a parameter supplementaryUplink in the ServingCellConfigCommonSlB IE, and/or a parameter supplementaryUplink in the ServingCellConfig IE, and/or other parameters.

The downlink canter (DL carrier) may be configured by, for example, a parameter downlinkConfigCommon in the ServingCellConfigCommon IE and/or a parameter downlinkConfigConunon in the ServingCellConfigCommonSIB IE, and/or other parameters.

Embodiment 1

Next, a method executed by a user equipment UE according to a first embodiment of the present invention will be described with reference to FIG. 1.

FIG. 1 shows a flowchart of a method executed by a user equipment UE according to a first embodiment of the present invention, wherein the method can be applied to any one of the following:

A cell.

A pair of uplink and downlink carriers in a cell. For example, an uplink carrier and a downlink carrier, as well as a supplementary uplink carrier and a downlink carrier.

A downlink carrier in a cell (for example, in a case that neither an uplink carrier nor a supplementary uplink carrier is configured in the cell, as well as in a case that the UE is not configured to monitor in the cell a DCI format, e.g., DCI format 0_0 or DCI format 0_1, for scheduling uplink data transmission).

An uplink carrier in a cell (for example, in a case that neither a supplementary uplink carrier is configured in the cell, nor the UE is configured to monitor a DCI format, e.g., DCI format 1_0 or DCI format 1_1, for scheduling downlink data transmission).

A supplementary uplink carrier in a cell (for example, in a case that neither an uplink carrier is configured in the cell, nor the UE is configured to monitor a DCI format, e.g., DCI format 1_0 or DCI format 1_1, for scheduling downlink data transmission).

As shown in FIG. 1, in the first embodiment of the present invention, the steps performed by the user equipment UE include a first step, a second step, a third step, a fourth step and a fifth step.

More specifically, in S101, a first step is performed, and specifically, one or more of the following is performed:

Determine a DCI format 0_0 monitored in a CSS. Herein:
The size of the frequency domain resource assignment field in the DCI format 0_0 is related to $N_{RB}^{UL,BWP}$ (e.g., the size of the frequency domain resource assignment field may be $\lceil \log_2(N_{RB}^{UL,BWP}(N_{RB}^{UL,BWP}+1)/2) \rceil$ bits).

Determine a DCI format 1_0 monitored in a CSS. Herein:
The size of the frequency domain resource assignment field in the DCI format 1_0 is related to $N_{RB}^{DL,BWP}$ (e.g., the size of the frequency domain resource assignment field may be $\lceil \log_2(N_{RB}^{DL,BWP}(N_{RB}^{DL,BWP}+1)/2) \rceil$ bits), wherein $N_{RB}^{DL,BWP}$ may be related to a CORESET 0 (i.e., a CORESET with ID equal to 0) and/or an initial downlink BWP (i.e., an initial DL BWP configured, for example, via a parameter initialDownlinkBWP). For example, if the CORESET 0 is configured in a cell, $N_{RB}^{DL,BWP}$ may be equal to the size of the CORESET 0; or if the CORESET 0 is not configured in the cell, $N_{RB}^{DL,BWP}$ may be equal to the size of an initial downlink BWP.

If the UE is configured to monitor a DCI format 0_0 in a CSS (or optionally, if the UE is configured to monitor a DCI format 0_0 and a DCI format 1_0 in the CSS) and if the number of information bits of the DCI format 0_0 before being padded is smaller than the payload size of the DCI format 1_0 monitored in the CSS and used to schedule the same serving cell, then perform zero padding on the DCI format 0_0 until the payload size of the DCI format 0_0 is equal to the payload size of the DCI format 1_0.

If the UE is configured to monitor a DCI format 0_0 in a CSS (or optionally, if the UE is configured to monitor a DCI format 0_0 and a DCI format 1_0 in the CSS) and if the number of information bits of the DCI format 0_0 before being truncated is larger than the payload size of the DCI format 1_0 monitored in the CSS and used to schedule the same serving cell, then truncate several of the most significant bits at the beginning of the frequency domain resource assignment field in the DCI format 0_0 to reduce the bitwidth of the frequency domain resource assignment field, so that the size of the DCI format 0_0 is equal to the size of the DCI format 1_0.

Optionally, in S101, other means may also be used to determine the DCI format 0_0 monitored in the CSS and the DCI format 1_0 monitored in the CSS and/or align the size of the DCI format 0_0 monitored in the CSS with the size of the DCI format 1_0 monitored in the CSS.

Besides, in S103, a second step is performed, and specifically, one or more of the following is performed:

Determine a DCI format 0_0 monitored in a USS. Herein:
The size of the frequency domain resource assignment field in the DCI format 0_0 is related to $N_{RB}^{UL,BWP}$ (e.g., the size of the frequency domain resource assignment field may be $\lceil \log_2(N_{RB}^{UL,BWP}(N_{RB}^{UL,BWP}+1)/2) \rceil$ bits).

Determine a DCI format 1_0 monitored in a USS. Herein:
The size of the frequency domain resource assignment field in the DCI format 1_0 is related to $N_{RB}^{DL,BWP}$ (e.g., the size of the frequency domain resource assignment field may be $\lceil \log_2(N_{RB}^{DL,BWP}(N_{RB}^{DL,BWP}+1)/2) \rceil$ bits), wherein $N_{RB}^{DL,BWP}$ may be related to an active downlink BWP (active DL BWP). For example, $N_{RB}^{DL,BWP}$ may be equal to the size of an active downlink BWP.

If the UE is configured to monitor a DCI format 0_0 in a USS (or optionally, if the UE is configured to monitor a DCI format 0_0 and a DCI format 1_0 in the USS) and if the number of information bits of the DCI format 0_0 before being padded is smaller than the payload size of the DCI format 1_0 monitored in the USS and used to schedule the same serving cell, then perform zero padding on the DCI format 0_0 until the payload size of the DCI format 0_0 is equal to the payload size of the DCI format 1_0.

If the UE is configured to monitor a DCI format 1_0 in a USS (or optionally, if the UE is configured to monitor a DCI format 0_0 and a DCI format 1_0 in the USS) and if the number of information bits of the DCI format 1_0 before being padded is smaller than the payload size of the DCI format 0_0 monitored in the USS and used to schedule the same serving cell, then perform zero padding on the DCI format 1_0 until the payload size of the DCI format 1_0 is equal to the payload size of the DCI format 0_0.

Optionally, in S103, other means may also be used to determine the DCI format 0_0 monitored in the USS and the DCI format 1_0 monitored in the USS and/or align the size of the DCI format 0_0 monitored in the USS with the size of the DCI format 1_0 monitored in the USS.

Besides, in S105, a third step is performed, and specifically, one or more of the following is performed:

Determine a DCI format 0_1 monitored in a USS. Herein:
The size of the frequency domain resource assignment field in the DCI format 0_1 is related to $N_{RB}^{UL,BWP}$ (e.g., the size of the frequency domain resource assignment field may be $\lceil \log_2(N_{RB}^{UL,BWP}(N_{RB}^{UL,BWP}+1)/2) \rceil$ bits).

Determine a DCI format 1_1 monitored in a USS. Herein:
The size of the frequency domain resource assignment field in the DCI format 1_1 is related to $N_{RB}^{DL,BWP}$ as (e.g., the size of the frequency domain resource assignment field may be $\lceil \log_2(N_{RB}^{DL,BWP}(N_{RB}^{DL,BWP}+1)/2) \rceil$ bits), wherein $N_{RB}^{DL,BWP}$ may be equal to the size of an active downlink BWP.

If the UE is configured to monitor the DCI format 0_1 in the USS, then adjust the size of the DCI format 0_1. For example, any one of the following is performed:
If the UE is configured to monitor the DCI format 0_1 in the USS, then perform 0-bit or 1-bit zero padding on the DCI format 0_1 until the size of the DCI format 0_1 is not equal to the size of the DCI format 0_0/1_0 monitored in the USS.

For example:

---

1> If the UE is configured to monitor the DCI format 0_1 in the USS,
   2> if the size of the DCI format 0_1 is equal to the size of the DCI format 0_0/1_0 monitored in the USS,
      3> perform 1-bit zero padding on the DCI format 0_1.
      3> complete the adjustment for the size of the DCI format 0_1.
   2> otherwise,
      3> complete the adjustment for the size of the DCI format 0_1.

---

If the UE is configured to monitor the DCI format 0_1 in the USS and if the size of the DCI format 0_1 is equal to the size of the DCI format 0_0/1_0 monitored in the USS, then perform 1-bit zero padding on the DCI format 0_1. For example:

---

1> If the UE is configured to monitor the DCI format 0_1 in the USS,
and
the size of the DCI format 0_1 is equal to the size of the DCI format 0_0/1_0 monitored in the USS,
   2> perform 1-bit zero padding on the DCI format 0_1.
   2> complete the adjustment for the size of the DCI format 0_1.

---

If the UE is configured to monitor the DCI format 0_1 in the USS, then perform 0-bit or 1-bit zero padding on the DCI format 0_1 until the size of the DCI format 0_1 is not equal to the size of the DCI format 0_0/1_0 monitored in the CSS.

For example:

---

1> If the UE is configured to monitor the DCI format 0_1 in the USS,
   2> if the size of the DCI format 0_1 is equal to the size of the DCI format 0_0/1_0 monitored in the CSS,
      3> perform 1-bit zero padding on the DCI format 0_1.
      3> complete the adjustment for the size of the DCI format 0_1.
   2> otherwise,
      3> complete the adjustment for the size of the DCI format 0_1.

---

If the UE is configured to monitor the DCI format 0_1 in the USS and if the size of the DCI format 0_1 is equal to the size of the DCI format 0_0/1_0 monitored in the CSS, then perform 1-bit zero padding on the DCI format 0_1. For example:

---

1> If the UE is configured to monitor the DCI format 0_1 in the USS,
and
the size of the DCI format 0_1 is equal to the size of the DCI format 0_0/1_0 monitored in the CSS,
   2> perform 1-bit zero padding on the DCI format 0_1.
   2> complete the adjustment for the size of the DCI format 0_1.

---

If the UE is configured to monitor the DCI format 0_1 in the USS, then perform 0-bit, 1-bit, or 2-bit zero padding on the DCI format 0_1 until the size of the DCI format 0_1 is neither equal to the size of the DCI format 0_0/1_0 monitored in the CSS nor equal to the size of the DCI format 0_0/1_0 monitored in the USS. For example:

---

1> If the UE is configured to monitor the DCI format 0_1 in the USS,
   2> if the size of the DCI format 0_1 is equal to the size of the DCI format 0_0/1_0 monitored in the CSS or the size of the DCI format 0_0/1_0 monitored in the USS,
      3> perform 1-bit zero padding on the DCI format 0_1.
      3> if the size of the DCI format 0_1 is equal to the size of the DCI format 0_0/1_0 monitored in the CSS or the size of the DCI format 0_0/1_0 monitored in the USS,
         4> perform 1-bit zero padding on the DCI format 0_1.
         4> complete the adjustment for the size of the DCI format 0_1.
      3> otherwise,
         4> complete the adjustment for the size of the DCI format 0_1.
   2> otherwise,
      3> complete the adjustment for the size of the DCI format 0_1.

---

If the UE is configured to monitor the DCI format 0_1 in the USS and if the size of the DCI format 0_1 is equal to the size of the DCI format 0_0/1_0 monitored in the CSS or equal to the size of the DCI format 0_0/1_0 monitored in the USS, then perform 1-bit or 2-bit zero padding on the DCI format 0_1 until the size of the DCI format 0_1 is neither equal to the size of the DCI format 0_0/1_0 monitored in the CSS nor equal to the size of the DCI format 0_0/1_0 monitored in the USS. For example:

---

1> If the UE is configured to monitor the DCI format 0_1 in the USS,
and
the size of the DCI format 0_1 is equal to the size of the DCI format 0_0/1_0 monitored in the CSS or the size of the DCI format 0_0/1_0 monitored in the USS,
   2> perform 1-bit zero padding on the DCI format 0_1.
   2> if the size of the DCI format 0_1 is equal to the size of the DCI format 0_0/1_0 monitored in the CSS or the size of the DCI format 0_0/1_0 monitored in the USS,
      3> perform 1-bit zero padding on the DCI format 0_1.
      3> complete the adjustment for the size of the DCI format 0_1.
   2> otherwise,
      3> complete the adjustment for the size of the DCI format 0_1.

---

If the UE is configured to monitor the DCI format 1_1 in the USS, then adjust the size of the DCI format 1_1. For example, any one of the following is performed:

If the UE is configured to monitor the DCI format 1_1 in the USS, then perform 0-bit or 1-bit zero padding on the DCI format 1_1 until the size of the DCI format 1_1 is not equal to the size of the DCI format 0_0/1_0 monitored in the USS.

For example:

---

1> If the UE is configured to monitor the DCI format 1_1 in the USS,
   2> if the size of the DCI format 1_1 is equal to the size of the DCI format 0_0/1_0 monitored in the USS,
      3> perform 1-bit zero padding on the DCI format 1_1.
      3> complete the adjustment for the size of the DCI format 1_1.
   2> otherwise,
      3> complete the adjustment for the size of the DCI format 1_1.

---

If the UE is configured to monitor the DCI format 1_1 in the USS and if the size of the DCI format 1_1 is equal to the size of the DCI format 0_0/1_0 monitored in the USS, then perform 1-bit zero padding on the DCI format 1_1. For example:

---

1> If the UE is configured to monitor the DCI format 1_1 in the USS,
and
the size of the DCI format 1_1 is equal to the size of the DCI format 0_0/1_0 monitored in the USS, -continued

```
2> perform 1-bit zero padding on the DCI format 1__1.
2> complete the adjustment for the size of the DCI format 1__1.
```

If the UE is configured to monitor the DCI format 1_1 in the USS, then perform 0-bit or 1-bit zero padding on the DCI format 1_1 until the size of the DCI format 1_1 is not equal to the size of the DCI format 0_0/1_0 monitored in the CSS.

For example:

```
1> If the UE is configured to monitor the DCI format 1__1 in the USS,
    2> if the size of the DCI format 1__1 is equal to the size of the DCI
       format 0__0/1__0 monitored in the CSS,
        3> perform 1-bit zero padding on the DCI format 1__1.
        3> complete the adjustment for the size of the DCI format 1__1.
    2> otherwise,
        3> complete the adjustment for the size of the DCI format 1__1.
```

If the UE is configured to monitor the DCI format 1_1 in the USS and if the size of the DCI format 1_1 is equal to the size of the DCI format 0_0/1_0 monitored in the CSS, then perform 1-bit zero padding on the DCI format 1_1. For example:

```
1> If the UE is configured to monitor the DCI format 1__1 in the USS,
and
the size of the DCI format 1__1 is equal to the size of the DCI format
0__0/1__0 monitored in the CSS,
    2> perform 1-bit zero padding on the DCI format 1__1.
    2> complete the adjustment for the size of the DCI format 1__1.
```

If the UE is configured to monitor the DCI format 1_1 in the USS, then perform 0-bit, 1-bit, or 2-bit zero padding on the DCI format 1_1 until the size of the DCI format 1_1 is neither equal to the size of the DCI format 0_0/1_0 monitored in the CSS nor equal to the size of the DCI format 0_0/1_0 monitored in the USS. For example:

```
1> If the UE is configured to monitor the DCI format 1__1 in the USS,
    2> if the size of the DCI format 1__1 is equal to the size of the DCI
       format 0__0/1__0 monitored in the CSS or the size of the DCI format
       0__0/1__0 monitored in the USS,
        3> perform 1-bit zero padding on the DCI format 1__1.
        3> if the size of the DCI format 1__1 is equal to the size of the DCI
           format 0__0/1__0 monitored in the CSS or the size of the DCI format
           0__0/1__0 monitored in the USS,
            4> perform 1-bit zero padding on the DCI format 1__1.
            4> complete the adjustment for the size of the DCI format 1__1.
        3> otherwise,
            4> complete the adjustment for the size of the DCI format 1__1.
    2> otherwise,
        3> complete the adjustment for the size of the DCI format 1__1.
```

If the UE is configured to monitor the DCI format 1_1 in the USS and if the size of the DCI format 1_1 is equal to the size of the DCI format 0_0/1_0 monitored in the CSS or equal to the size of the DCI format 0_0/1_0 monitored in the USS, then perform 1-bit or 2-bit zero padding on the DCI format 1_1 until the size of the DCI format 1_1 is neither equal to the size of the DCI format 0_0/1_0 monitored in the CSS nor equal to the size of the DCI format 0_0/1_0 monitored in the USS.

For example:

```
1> If the UE is configured to monitor the DCI format 1__1 in the USS,
and
the size of the DCI format 1__1 is equal to the size of the DCI format
0__0/1__0 monitored in the CSS or the size of the DCI format 0__0/1__0
monitored in the USS,
    2> perform 1-bit zero padding on the DCI format 1__1.
    2> if the size of the DCI format 1__1 is equal to the size of the DCI
       format 0__0/1__0 monitored in the CSS or the size of the DCI format
       0__0/1__0 monitored in the USS,
        3> perform 1-bit zero padding on the DCI format 1__1.
        3> complete the adjustment for the size of the DCI format 1__1.
    2> otherwise,
        3> complete the adjustment for the size of the DCI format 1__1.
```

Herein:

The size of the DCI format 0_0/1_0 monitored in the CSS refers to the common size of the DCI format 0_0 monitored in the CSS and the DCI format 1_0 monitored in the CSS.

The size of the DCI format 0_0/1_0 monitored in the USS refers to the common size of the DCI format 0_0 monitored in the USS and the DCI format 1_0 monitored in the USS.

Optionally, the DCI format 0_1 monitored in the USS and the DCI format 0_0/1_0 monitored in the USS may be respectively monitored in different USSs. For example, the DCI format 0_1 monitored in the USS may correspond to a USS configured via the SearchSpace IF, and the DCI format 0_0/1_0 monitored in the USS may correspond to another USS configured via the SearchSpace IE.

Optionally, the DCI format 1_1 monitored in the USS and the DCI format 0_0/1_0 monitored in the USS may be respectively monitored in different USSs. For example, the DCI format 1_1 monitored in the USS may correspond to a USS configured via the SearchSpace IF, and the DCI format 0_0/1_0 monitored in the USS may correspond to another USS configured via the SearchSpace IE.

Optionally, in S105, other means may also be used to determine the DCI format 0_1 monitored in the USS, and/or adjust the size of the DCI format 0_1, and/or determine the DCI format 1_1 monitored in the USS, and/or adjust the size of the DCI format 1_1.

Besides, in S107, a fourth step is performed, and specifically, one or more of the following is performed:

If the following two conditions are satisfied, the method executed by the user equipment in the first embodiment of the present invention ends:

The number of different DCI format sizes configured for the UE in a cell does not exceed $S_1$.

The number of different DCI format sizes for C-RNTIs configured for the UE in a cell does not exceed $S_2$.

Herein:

The term "for C-RNTI" may refer to scrambling the CRC of the DCI format with a C-RNTI.

The $S_1$ may be a predefined constant (e.g., $S_1=4$), a pre-configured value, or a value of a parameter obtained, for example, from a base station (for example, obtained via a DCI, a MAC CE or RRC signaling), or a default value may be used when the parameter is not configured.

The $S_2$ may be a predefined constant (e.g., $S_2=3$), a pre-configured value, or a value of a parameter obtained, for example, from a base station (for example, obtained via a DCI, a MAC CE or RRC signaling), or a default value may be used when the parameter is not configured.

Optionally, in S107, whether the method executed by the user equipment according to the first embodiment of the present invention can be ended may be determined via other conditions or a combination of conditions.

Besides, in S109, a fifth step is performed, and specifically, one or more of the following is performed:

Otherwise:

Remove the padding bits (if any) introduced in S105.

Determine a DCI format 1_0 monitored in a USS. Herein:

The size of the frequency domain resource assignment field in the DCI format 1_0 is related to $N_{RB}^{DL,BWP}$ as (e.g., the size of the frequency domain resource assignment field may be $\lceil \log_2(N_{RB}^{DL,BWP}(N_{RB}^{DL,BWP}+1)/2) \rceil$ bits), wherein $N_{RB}^{DL,BWP}$ may be related to a CORESET 0 and/or an initial downlink BWP. For example, if the CORESET 0 is configured in a cell, $N_{RB}^{DL,BWP}$ may be equal to the size of the CORESET 0; or if the CORESET 0 is not configured in the cell, $N_{RB}^{DL,BWP}$ may be equal to the size of an initial downlink BWP.

Determine a DCI format 0_0 monitored in a USS. Herein:

The size of the frequency domain resource assignment field in the DCI format 0_0 is related to $N_{RB}^{UL,BWP}$ (e.g., the size of the frequency domain resource assignment field may be $\lceil \log_2(N_{RB}^{UL,BWP}(N_{RB}^{UL,BWP}+1)/2) \rceil$ bits).

If the number of information bits of the DCI format 0_0 monitored in the USS before being padded is smaller than the payload size of the DCI format 1_0 monitored in the USS and used to schedule the same serving cell, then perform zero padding on the DCI format 0_0 until the payload size of the DCI format 0_0 is equal to the payload size of the DCI format 1_0.

Optionally, this action is performed only when the UE is configured to monitor the DCI format 0_0 in the USS.

Optionally, this action is performed only when the UE is configured to monitor the DCI format 0_0 and the DCI format 1_0 in the USS.

If the number of information bits of the DCI format 0_0 monitored in the USS before being truncated is larger than the payload size of the DCI format 1_0 monitored in the USS and used to schedule the same serving cell, then truncate several of the most significant bits at the beginning of the frequency domain resource assignment field in the DCI format 0_0 to reduce the bitwidth of the frequency domain resource assignment field, so that the size of the DCI format 0_0 is equal to the size of the DCI format 1_0.

Optionally, this action is performed only when the UE is configured to monitor the DCI format 0_0 in the USS.

Optionally, this action is performed only when the UE is configured to monitor the DCI format 0_0 and the DCI format 1_0 in the USS.

Optionally, in S109, other means may also be used to process the padding bits (if any) introduced in S105, and/or re-determine the DCI format 0_0 monitored in the USS and/or the DCI format 1_0 monitored in the USS, and/or adjust the size of the DCI format 0_0 and/or the size of the DCI format 1_0.

Optionally, in the first embodiment of the present invention, for a given DCI format (e.g., any one of DCI format 0_0 monitored in a CSS, DCI format 1_0 monitored in a CSS, DCI format 0_0 monitored in a USS, DCI format 1_0 monitored in a USS, DCI format 0_1 monitored in a USS, and DCI format 1_1 monitored in a USS), the zero padding means can be any one of the following (in an applicable condition):

Several zero padding bits are generated and padded into a field used for placing zero padding bits in the DCI format, such as the "padding bits" field in the DCI format 0_0.

Several zero padding bits are appended after the last field of the DCI format.

Several zero padding bits are inserted before the first field of the DCI format.

Herein:

The value of each of the zero padding bits is 0.

The number of the zero padding bits may be a constant, for example 0, 1, or 2.

If the number of the zero padding bits is 0, the zero padding does not correspond to any operation (for example, an operation for generating the zero padding bits, or an operation for padding, appending, or inserting the zero padding bits).

The number of the zero padding bits may also be an indeterminate number; in this case, a zero padding operation corresponds to zero, one or more zero padding bits until a condition related to the zero padding operation is satisfied. For example, if the size of a DCI format A is 39 bits, the size of the DCI format B is 39 bits, and the size of the DCI format C is 40 bits, then the expression "performing zero padding on the DCI format A until the size of the DCI format A is neither equal to the size of the DCI format B nor equal to the size of the DCI format C" means the expression "performing 2-bit zero padding on the DCI format A". For example, if the size of a DCI format A is 38 bits, the size of the DCI format B is 39 bits, and the size of the DCI format C is 40 bits, then the expression "performing zero padding on the DCI format A until the size of the DCI format A is neither equal to the size of the DCI format B nor equal to the size of the DCI format C" means the expression "not performing any operation" or "performing 0-bit zero padding on the DCI format A".

Optionally, in the first embodiment of the present invention, the zero padding operation may also be performed by other means.

Optionally, in the first embodiment of the present invention, the uplink carrier may be either mandatorily or optionally configured in the cell, and the supplementary uplink carrier may also be mandatorily or optionally configured in the cell.

Optionally, in any one of S101 (e.g., determining a DCI format 0_0 monitored in a CSS), S103 (e.g., determining a DCI format 0_0 monitored in a USS), S105 (e.g., determining a DCI format 0_1 monitored in a USS), and S109 (e.g., determining a DCI format 0_0 monitored in a USS) in the first embodiment of the present invention, the $N_{RB}^{UL,BWP}$ may take a reference bandwidth value (denoted as $BW_{ref}$) corresponding to each of the reference bandwidth conditions respectively under a case that one or more reference bandwidth conditions are satisfied.

Herein:

Each of the reference bandwidth conditions may be one or more of the following (in any combination by "and" or "or" in an applicable condition):

There is no condition (that is, the reference bandwidth condition can always be satisfied). For example, at this time, the expression "if the uplink carrier is configured in the cell, and the supplementary uplink carrier is configured, and the reference bandwidth condition is satisfied" is equivalent to the expression "if the uplink carrier is configured in the cell, and the supplementary uplink carrier is configured".

No uplink carrier is configured in the cell.
An uplink carrier has been configured in the cell.
No supplementary uplink carrier is configured in the cell.
A supplementary uplink carrier has been configured in the cell.
No PUCCH carrier is configured in the cell.
A PUCCH carrier has been configured in the cell.
No parameter pusch-Config is configured on the uplink carrier.
No parameter pusch-Config is configured on the supplementary uplink carrier.
A parameter pusch-Config has been configured on the uplink carrier.
A parameter pusch-Config has been configured on the supplementary uplink carrier.
No parameter pucch-Config is configured on the uplink carrier.
No parameter pucch-Config is configured on the supplementary uplink carrier.
A parameter pucch-Config has been configured on the uplink carrier.
A parameter pucch-Config has been configured on the supplementary uplink carrier.
The uplink carrier is not configured to transmit a PUSCH.
The supplementary uplink carrier is not configured to transmit a PUSCH.
The uplink carrier has been configured to transmit a PUSCH.
The supplementary uplink carrier has been configured to transmit a PUSCH.
The uplink carrier is not configured to transmit a PUCCH.
The supplementary uplink carrier is not configured to transmit a PUCCH.
The uplink carrier has been configured to transmit a PUCCH.
The supplementary uplink carrier has been configured to transmit a PUCCH.
The PUCCH carrier is not configured to transmit a PUSCH.
The PUCCH carrier has been configured to transmit a PUSCH.
The PUCCH carrier is the uplink carrier.
The PUCCH carrier is the supplementary uplink carrier.
Each reference bandwidth condition becomes another reference bandwidth condition after taking "not" (or taking "no"). For example, the condition that "the uplink carrier has been configured to transmit a PUSCH, and the supplementary uplink carrier has been configured to transmit a PUSCH" is a reference bandwidth condition, and the condition that "the uplink carrier has not been configured to transmit a PUSCH, or the supplementary uplink carrier has not been configured to transmit a PUSCH" obtained by taking "not" is also a reference bandwidth condition.
The one or more reference bandwidth conditions and their respective corresponding reference bandwidth values may be defined for S101, S103, S105, and S109, respectively, or the same definition may be used for S101, S103, S105, and S109.

In addition, in any one of S101 and S109 in the first embodiment of the present invention, the reference bandwidth value may be defined in any one of the following manners:

$BW_{ref} = N_{RB}^{UL,initial}$.
$BW_{ref} = N_{RB}^{SUL,initial}$.
$BW_{ref} = \max(N_{RB}^{UL,initial}, N_{RB}^{SUL,initial})$.
$BW_{ref} = \min(N_{RB}^{UL,initial}, N_{RB}^{SUL,initial})$.
$BW_{ref} = N_{RB}^{UL,x_1}$.
$BW_{ref} = \max(N_{RB}^{UL,initial}, N_{RB}^{UL,x_1})$.
$BW_{ref} = \min(N_{RB}^{UL,initial}, N_{RB}^{UL,x_1})$.
$BW_{ref} = \max(N_{RB}^{UL,x_1}, N_{RB}^{SUL,initial})$.
$BW_{ref} = \min(N_{RB}^{UL,x_1}, N_{RB}^{SUL,initial})$.
$BW_{ref} = \min(\max(N_{RB}^{UL,initial}, N_{RB}^{SUL,initial}), N_{RB}^{UL,x_1})$.
$BW_{ref} = \max(\min(N_{RB}^{UL,initial}, N_{RB}^{SUL,initial}), N_{RB}^{UL,x_1})$.

$Bw_{ref}$=size of an initial uplink BWP on a PUCCH carrier (e.g., uplink carrier or supplementary uplink. carrier).
$Bw_{ref}$=size of an initial uplink BWP on a non-PUCCH carrier (e.g., uplink carrier or supplementary uplink carrier).
The size of an initial uplink BWP on a carrier related to an uplink direction (e.g., uplink carrier or supplementary uplink carrier) and configured with a parameter pusch-Config.
The size of an initial uplink BWP on a carrier related to an uplink direction (e.g., uplink carrier or supplementary uplink carrier) and not configured with a parameter pusch-Config.
The size of an initial uplink BWP on a carrier related to an uplink direction (e.g., uplink carrier or supplementary uplink carrier) and configured with a parameter pucch-Config.
The size of an initial uplink BWP on a carrier related to an uplink direction (e.g., uplink carrier or supplementary uplink carrier) and not configured with a parameter pucch-Config.
The size of an initial uplink BWP on a carrier related to an uplink direction (e.g., uplink carrier or supplementary uplink carrier) and configured to transmit a PUSCH.
The size of an initial uplink BWP on a carrier related to an uplink direction (e.g., uplink carrier or supplementary uplink carrier) and not configured to transmit a PUSCH.
The size of an initial uplink BWP on a carrier related to an uplink direction (e.g., uplink carrier or supplementary uplink carrier) and configured to transmit a PUCCH.
The size of an initial uplink BWP on a carrier related to an uplink direction (e.g., uplink carrier or supplementary uplink carrier) and not configured to transmit a PUCCH.

Herein:
$N_{RB}^{UL,initial}$ is the size of an initial uplink BWP (e.g., an initial UL BWP configured, for example, by a parameter initialUplinkBWP) on an uplink carrier in the cell. Optionally, if no uplink carrier is configured in the cell, the $N_{RB}^{UL,initial}$ may take a default value.
$N_{RB}^{SUL,initial}$ is the size of an initial uplink BWP on a supplemental uplink carrier in the cell. Optionally, if no supplemental uplink carrier is configured in the cell, the $N_{RB}^{SUL,initial}$ may take a default value.
$N_{RB}^{UL,x_1}$ may be a predefined constant, a pre-configured value, or a value of a parameter obtained, for example, from a base station (for example, obtained via a DCI, a MAC CE or RRC signaling), or a default value may be used when the parameter is not configured. Optionally, the $N_{RB}^{UL,x_1}$ may be defined respectively for S101 and S109, or the same definition may be used for S101 and S109.

In addition, in any one of S103 and S105 in the first embodiment of the present invention, the reference bandwidth value may be defined in any one of the following manners:

$BW_{ref} = N_{RB}^{UL,active}$.

$BW_{ref} = N_{RB}^{SUL,active}$.

$BW_{ref} = max(N_{RB}^{UL,active}, N_{RB}^{SUL,active})$.

$BW_{ref} = min(N_{RB}^{UL,active}, N_{RB}^{SUL,active})$.

$BW_{ref} = N_{RB}^{UL,x_2}$.

$BW_{ref} = max(N_{RB}^{UL,active}, N_{RB}^{UL,x_2})$.

$BW_{ref} = min(N_{RB}^{UL,active}, N_{RB}^{UL,x_2})$.

$BW_{ref} = max(N_{RB}^{UL,x_2}, N_{RB}^{SUL,active})$.

$BW_{ref} = min(N_{RB}^{UL,x_2}, N_{RB}^{SUL,active})$.

$BW_{ref} = min(max(N_{RB}^{UL,active}, N_{RB}^{SUL,active}), N_{RB}^{UL,x_2})$.

$BW_{ref} = max(min(N_{RB}^{UL,active}, N_{RB}^{SUL,active}), N_{RB}^{UL,x_2})$.

$BW_{ref}$ = size of an active uplink BWP on a PUCCH carrier (e.g., uplink carrier or supplementary uplink carrier).

$BW_{ref}$ = size of an active uplink BWP on a non-PUCCH carrier (e.g., uplink carrier or supplementary uplink carrier).

The size of an active uplink BWP on a carrier (e.g., uplink carrier or supplementary uplink carrier) related to an uplink direction and configured with a parameter pusch-Config.

The size of an active uplink BWP on a carrier related to an uplink direction (e.g., uplink carrier or supplementary uplink carrier) and not configured with a parameter pusch-Config.

The size of an active uplink BWP on a carrier related to an uplink direction (e.g., uplink carrier or supplementary uplink carrier) and configured with a parameter pucch-Config.

The size of an active uplink BWP on a carrier related to an uplink direction (e.g., uplink carrier or supplementary uplink carrier) and not configured with a parameter pucch-Config.

The size of an active uplink BWP on a carrier related to an uplink direction (e.g., uplink carrier or supplementary uplink carrier) and configured to transmit a PUSCH.

The size of an active uplink BWP on a carrier related to an uplink direction (e.g., uplink carrier or supplementary uplink carrier) and not configured to transmit a PUSCH.

The size of an active uplink BWP on a carrier related to an uplink direction (e.g., uplink carrier or supplementary uplink carrier) and configured to transmit a PUCCH.

The size of an active uplink BWP on a carrier related to an uplink direction (e.g., uplink carrier or supplementary uplink carrier) and not configured to transmit a PUCCH.

Herein:

$N_{RB}^{UL,active}$ is the size of an active uplink BWP (active UL BWP) on an uplink carrier in the cell. Optionally, if no uplink carrier is configured in the cell, the $N_{RB}^{UL,active}$ may take a default value.

$N_{RB}^{SUL,active}$ is the size of an active uplink BWP on a supplemental uplink carrier in the cell. Optionally, if no supplemental uplink carrier is configured in the cell, the $N_{RB}^{SUL,active}$ may take a default value.

$N_{RB}^{UL,x_2}$ may be a predefined constant, a pre-configured value, or a value of a parameter obtained, for example, from a base station (for example, obtained via a DCI, a MAC CE or RRC signaling), or a default value may be used when the parameter is not configured. Optionally, the $N_{RB}^{UL,x_2}$ may be defined respectively for S103 and S105, or the same definition may be used for S103 and S105.

Optionally, in the first embodiment of the present invention, the method for determining a DCI format (e.g., DCI format 1_0 monitored in a CSS, or DCI format 0_0 monitored in a CSS, or DCI format 1_0 monitored in a USS, or DCI format 0_0 monitored in a USS, or DCI format 1_1 monitored in a USS, or DCI format 0_1 monitored in a USS) may be to determine whether fields of the DCI format exist and the size of the fields (if any) according to definition of each field in the DCI format and configuration information of a parameter related to the field (e.g., whether the parameter exists or a value of the parameter) and/or according to information related to the field determined in the DCI size alignment procedure (for example, one or more steps performed in the first embodiment of the present invention); in addition, the method may determine the size of the DCI format according to the size of all fields in the DCI format. For a given field, the configuration information may not exist or may be UE-specific configuration information, BWP-specific configuration information, or cell-specific configuration information.

Optionally, in the first embodiment of the present invention, for a certain DCI format or for some or all DCI formats, the step of "determining a DCI format" only needs to be performed for the DCI format when the UE is configured to monitor the DCI format. For example, the DCI format 0_1 monitored in the USS only needs to be determined when the UE is configured to monitor the DCI format 0_1 in the USS.

Optionally, in the first embodiment of the present invention, a CSS can also be replaced with a CSS set.

Optionally, in the first embodiment of the present invention, a USS can also be replaced with a USS set.

Optionally, in the first embodiment of the present invention, "a cell" and "a serving cell" may be used interchangeably.

In this way, in the first embodiment of the present invention, the DCI format 0_0/1_0 monitored in the CSS and the DCI format 0_0/1_0 monitored in the USS are respectively considered at the same time when the zero padding is performed on the DCI format 0_1 monitored in the USS and the DCI format 1_1 monitored in the USS, thereby avoiding DCI format ambiguity generated when the UE receives the DCI and improving the reliability of the downlink control signaling.

Embodiment 2

Next, a method executed by a user equipment UE according to a second embodiment of the present invention will be described with reference to FIG. 2.

Figure 2:
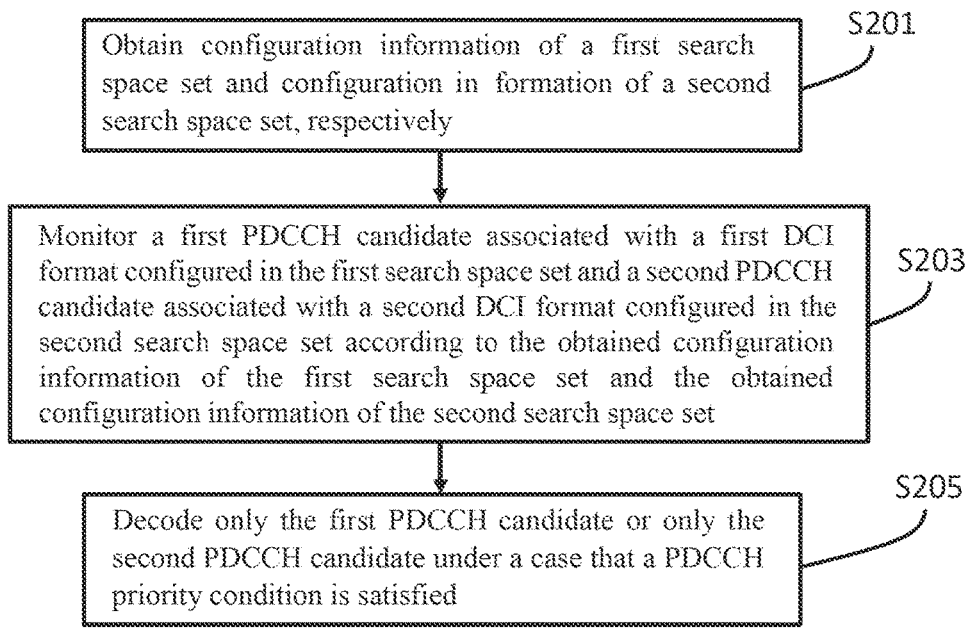
FIG. 2 shows a flowchart of a method executed by a user equipment according to a second embodiment of the present invention.

FIG. 2 shows a flowchart of a method executed by a user equipment UE according to a second embodiment of the present invention.

As shown in FIG. 2, in the second embodiment of the present invention, the steps performed by the user equipment UE include a step S201, a step S203, and a step S205.

Specifically, in the step S201, configuration information of one or more parameters of a first search space set and configuration information of one or more parameters of a second search space set are respectively obtained. For example, the configuration information is obtained from predefined information or pre-configured information, or the configuration information is obtained from a base station (for example, configuration information obtained via a DCI, a MAC CE or RRC signaling), or a default value may be used when the parameter is not configured.

Herein:

The first search space set may be a type 3-PDCCH CSS set. For example, the type 3-PDCCH CSS set may be configured via SearchSpace IE, where the parameter searchSpaceType is configured to be common.

The DCI format configured in the first search space set may include at least one of a DCI format 0_0 and a DCI format 1_0. Optionally, the CRC of the DCI format 0_0 and/or the CRC of the DCI format 1_0 may be scrambled with C-RNTI, MCS-C-RNTI, or CS-RNTI.

The CORESET associated with the first search space set is referred to as a first CORESET.

The second search space set may be a USS set. For example, the USS set may be configured via SearchSpace IE, where the parameter searchSpaceType is configured to be ue-Specific.

The DCI format configured in the second search space set may be one of the following:

at least one of a DCI format 0_1 and a DCI format 1_1.
at least one of a DCI format 0_0 and a DCI format 1_0.

Optionally, the CRC of the DCI format (e.g., DCI format 0_1, DCI format 1_1, or DCI format 0_0, or DCI format 1_0) may be scrambled with C-RNTI, MCS-C-RNTI, or CS-RNTI.

The CORESET associated with the second search space is referred to as a second CORESET.

Besides, in the step S203, according to the configuration information and/or other information, a first PDCCH candidate associated with a first DCI format configured in the first search space set and a second PDCCH candidate associated with a second DCI format configured in the second search space set are monitored on, for example, an active downlink BWP (active DL BWP).

Finally, in the step S205, one of the following actions is performed under a case that a PDCCH priority condition is satisfied:

decoding only the first PDCCH candidate.
decoding only the second PDCCH candidate.

Herein, the PDCCH priority condition may be one or more of the following (in any combination by "and" or "or" in an applicable condition):

Conditions related to a CORESET, for example, one or more of the following (in any combination by "and" or "or" in an applicable condition):
The first CORESET is a reference CORESET.
The second CORESET is a reference CORESET.

Herein, the reference CORESET may be a predefined CORESET (for example, CORESET 0, i.e., CORESET with an ID equal to 0), may be a pre-configured CORESET, may be a CORESET indicated via a DCI, a MAC CE, or RRC signaling, or may be a CORESET determined by other means.

Conditions related to a type of DCI format, for example, one or more of the following (in any combination by "and" or "or" in an applicable condition):
The lint DCI format is a DCI format 0_0.
The first DCI format is a DCI format 1_0.
The second DCI format is a DCI format 0_0.
The second DCI format is a DCI format 1_0.
The second DCI format is a DCI format 0_1.
The second DCI format is a DCI format 1_1.

Conditions related to a size of DCI format. For example, the size of the first DCI format and the size of the second DCI format are equal.

Conditions related to a RNTI, for example, one or more of the following (in any combination by "and" or "or" in an applicable condition):
The CRC of the first DCI format is scrambled with C-RNTI.
The CRC of the first DCI format is scrambled with MCS-C-RNTI.
The CRC of the first DCI format is scrambled with CS-RNTI.
The CRC of the second DCI format is scrambled with C-RNTI.
The CRC of the second DCI format is scrambled with MCS-C-RNTI.
The CRC of the second DCI format is scrambled with CS-RNTI.

Conditions related to PDCCH scrambling. For example, the first PDCCH candidate and the second PDCCH candidate use the same scrambling sequence (e.g., the same initial scrambling value $c_{init}$).

Conditions related to a CCE. For example, the first PDCCH candidate and the second PDCCH candidate use the same group of CCEs (including one or more CCEs).

In this way, in the second embodiment of the present invention, the priority between PDCCH candidates in different search space is set, thereby avoiding DCI format ambiguity generated when the UE receives the DCI and improving the reliability of the downlink control signaling.

Embodiment 3

Next, a method executed by a user equipment UE according to a third embodiment of the present invention will be described with reference to FIG. 3.

Figure 3:
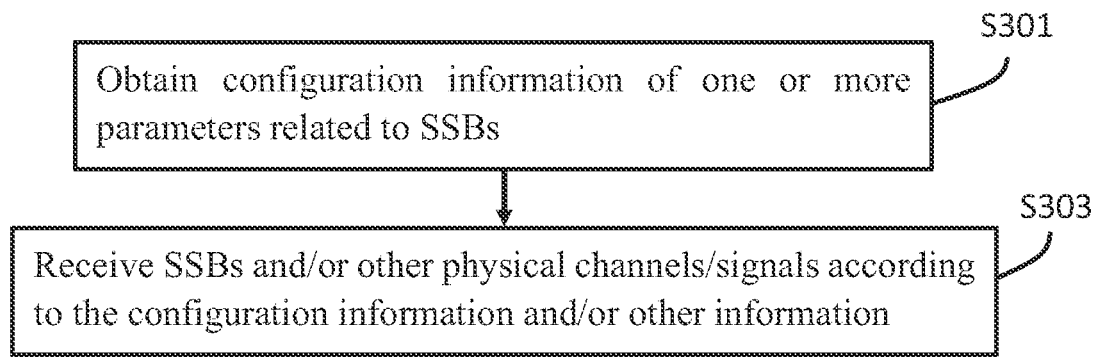
FIG. 3 shows a flowchart of a method executed by a user equipment according to a third embodiment of the present invention.

FIG. 3 shows a flowchart of a method executed by a user equipment UE according to a third embodiment of the present invention.

As shown in FIG. 3, in the third embodiment of the present invention, the steps performed by the user equipment UE include a step S301 and a step S303.

Specifically, in the step S301, configuration information of one or more parameters related to SSBs is obtained. For example, the configuration information is obtained from predefined information or pre-configured information, or the configuration information is obtained from a base station (for example, configuration information obtained via a DCI, a MAC CE or RRC signaling), or a default value may be used when the parameter is not configured.

Herein, the configuration information of the one or more parameters may include:

configuration information related to a quasi co-location. For example, the SSB set $\{i_1, i_2, \ldots, i_{N_1}\}$ is quasi-collocated with the SSB set $\{j_1, j_2, \ldots, j_{N_2}\}$. Herein:

The SSB may be an SSB (or a candidate SSB) that may be transmitted or an SSB that is actually transmitted.

$i_1, i_2, \ldots, i_{N_1}$ and $j_1, j_2, \ldots, j_{N_2}$ are SSB indexes (or SSB block indexes), for example, candidate SSB indexes or SSB indexes that are actually transmitted.

N1 and N2 are integers.

The quasi co-location may refer to a quasi co-location in one or more of the following aspects:
Doppler spread.
Doppler shift.
Average gain.
Average delay.
Delay spread.
Spatial Rx parameter.

Optionally, if the quasi co-location is performed with respect to Doppler shift, Doppler spread, average delay and delay spread, it is referred to as a quasi co-location with respect to QCL-Type A; if the quasi co-location is performed with respect to Doppler shift and Doppler spread, it is referred to as a quasi co-location with respect to QCL-Type B; if the quasi co-location is performed with respect to Doppler shift and average delay, it is referred to as a quasi co-location with respect to QCL-Type C; and if the quasi co-location is performed with respect to Spatial Rx parameter, it is referred to as a quasi co-location with respect to QCL-Type D.

The configuration information related to the quasi co-location may include multiple combinations of the set $\{i_1, i_2, \ldots, i_{N_1}\}$ and the set $\{j_1, j_2, \ldots, j_{N_2}\}$. For example, the configuration information related to the quasi co-location may indicate that the SSBs with indexes $\{0, 1\}$ are quasi co-located with the SSBs with indexes $\{2, 3\}$ and that the SSB with index $\{8\}$ is quasi co-located with the SSBs with indexes $\{10, 11\}$.

Besides, in the step S303, the SSBs and/or other physical channels/signals are received according to the configuration information and/or other information.

For example, the SSBs corresponding to different indexes are merged.

For another example, if the configuration information related to the quasi co-location indicates that the SSB with index 0 is quasi co-located with the SSB with index 9 and if the SSB with index 0 has been successfully received by a receiving beam 1, then the receiving beam 1 is used to receive the SSB with index 9.

In this way, the third embodiment of the present invention greatly improves the flexibility of the quasi co-location configuration when the number of actually transmitted SSB indexes is small (for example, in a case that a 5G is deployed in a low frequency band) by indicating the quasi co-location information between the SSBs with different indexes, and enables the UE to improve the performance of the receiver by using accurate quasi co-location information in this case.

Embodiment 4

Next, a method executed by a user equipment according to a fourth embodiment of the present disclosure will be described with reference to FIG. 4.

Figure 4:
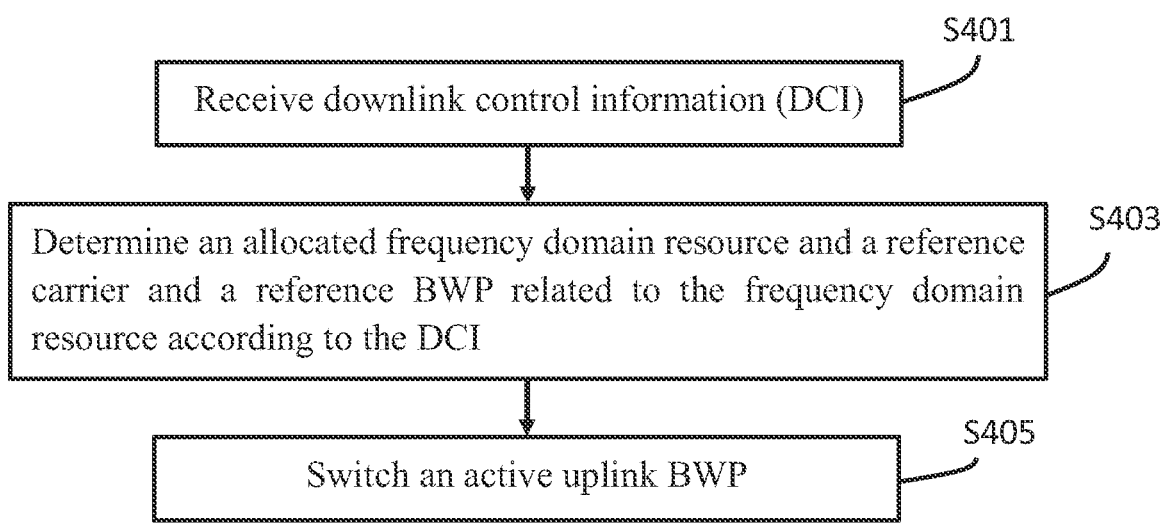
FIG. 4 shows a flowchart of a method executed by a user equipment according to a fourth embodiment of the present invention.

FIG. 4 shows a flowchart of a method executed by a user equipment according to a fourth embodiment of the present disclosure.

As shown in FIG. 4, in the fourth embodiment of the present disclosure, the steps performed by the user equipment UE include a step S401, a step S403, and a step S405.

Specifically, in the step S401, downlink control information (DCI) is received.

Herein:

The DCI may be configured to schedule the transmission of a PUSCH.

The DCI format may be a DCI format 0_1 monitored in a user search space (USS). For example, the USS may be configured via SearchSpace IE, where the parameter searchSpaceType is configured to be ue-Specific.

The CRC of the DCI may be scrambled with C-RNTI, may be scrambled with MCS-C-RNTI, may be scrambled with CS-RNTI, or may be scrambled with other RNTIs.

The DCI may include a UL/SUL indicator field, the size of which may be 0 bits (in this case, the UL/SUL indicator field may be considered not to exist) or 1 bit.

The DCI may include a BWP (Bandwidth part) indicator field, the size of which may be 0 bits (in this case, the BWP indicator field may be considered not to exist), or 1 bit, or 2 bits.

In addition, in the step S403, an allocated frequency domain resource and a reference carrier and a reference BWP related to the frequency domain resource are determined according to the DCI and/or other information.

Herein:

The reference carrier may be a carrier which is related to an uplink direction (e.g., uplink carrier or supplementary uplink carrier) and on which the frequency domain resource is located.

The reference BWP may be a BWP on the reference carrier on which the frequency domain resource is located.

The reference BWP may be an active uplink BWP of the reference carrier or may not be the active uplink BWP of the reference carrier.

Besides, in the step S405, an active uplink BWP is switched. For example, one or more of the following is performed:

If the reference BWP is not an active uplink BWP of the reference carrier, the reference BWP is determined as the active uplink BWP of the reference carrier.

If another carrier related to an uplink direction (e.g., uplink carrier or supplementary uplink carrier) other than the reference carrier is configured in the cell where the reference carrier is located, a BWP configured on the another carrier related to the uplink direction and configured with an ID equal to the ID of the reference BWP is determined as an active uplink BWP of the another carrier related to the uplink direction.

In this way, the fourth embodiment of the present invention greatly simplifies the dependence on an active uplink BWP in the DCI size alignment process and improves the execution efficiency of the DCI size alignment process by simultaneously switching the active uplink BWP of an uplink carrier and the active uplink BWP of a supplementary uplink carrier.

MODIFIED EXAMPLE

In the following, a user equipment that can execute the method of the present invention performed by the user equipment described in detail above is described as a modified example with reference to FIG. 5.

Figure 5:
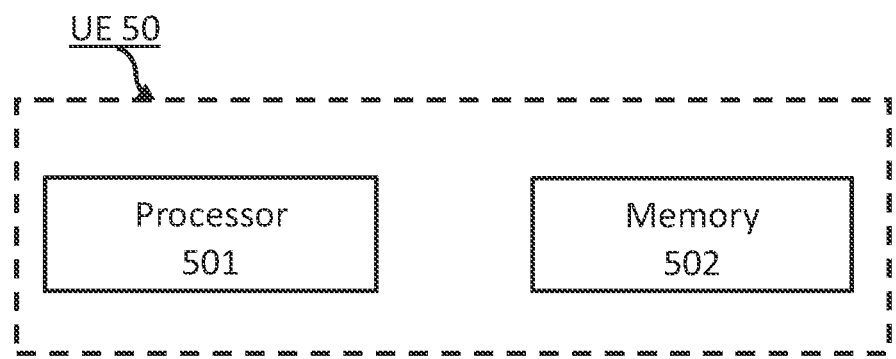
FIG. 5 shows a block diagram schematically illustrating a user equipment according to the present invention.

FIG. 5 is a block diagram showing a user equipment UE according to the present invention.

As shown in FIG. 5, the user equipment UE 50 includes a processor 501 and a memory 502. The processor 501 may include, for example, a microprocessor, a microcontroller, an embedded processor, or the like. The memory 502 may include, for example, a volatile memory (e.g., random access memory; RAM), a hard disk drive (HDD), a non-volatile memory (e.g., flash memory), or other memory. The memory 502 has program instructions stored thereon. The instructions, when executed by the processor 501, may perform the methods executed by the user equipment, which have been described above in detailed according to the present invention.

The method and related equipment of the present invention have been described above in conjunction with preferred embodiments. Those skilled in the art can understand that the methods shown above are only exemplary, and the various embodiments described above can be combined with one another without any contradiction. The method of the present invention is not limited to the steps and their sequences shown above. The network nodes and user equipments shown above may comprise more modules, e.g., modules that can be developed or will be developed in the future for base stations, MMEs, or LTEs, etc. Various identities shown above are only exemplary rather than restrictive, and the present invention is not limited to the information elements served as examples of these identities. Those skilled in the art can make many changes and modifications based on the teaching of the illustrated embodiment.

It should be understood that the above embodiments of the present invention may be implemented through software, hardware or a combination of software and hardware. For example, various components in the base station and the user equipment in the above embodiments may be implemented through various devices, including but not limited to an analog circuit device, a digital circuit device, a digital signal processing (DSP) circuit, a programmable processor, an application specific integrated circuit (ASIC), a field programmable gate array (FPGA), a programmable logic devices (CPLD), and the like.

In the present application, the "base station" refers to a mobile communication data and control switching center with large transmission power and wide coverage area and includes resource allocation scheduling function, data receiving and transmitting function, and the like. The "user equipment" refers to a user mobile terminal such as a terminal device, e.g., a mobile phone, a notebook, or the like, which can perform wireless communication with a base station or a micro base station.

In addition, the embodiments of the present invention disclosed here may be implemented on a computer program product. More specifically, the computer program product may be described as below. The computer program product has a computer-readable medium on which computer program logic is encoded. The computer program logic provides relevant operations to implement the above-described technical solution of the present invention when the computer program logic is executed on a computing apparatus. The computer program logic enables a processor to execute the operations (methods) described in the embodiments of the present invention when the computer program logic is executed on at least one processor of a computing system. Such an arrangement of the present invention is typically provided as software, a code, and/or other data structures that are configured or encoded on a computer-readable medium, such as an optical medium (e.g., a CD-ROM), a floppy disk or a hard disk, or, for example, firmware or microcodes on one or more other media like ROM or RAM or PROM chips, or downloadable software images, shared database, and the like in one or more modules. Software or firmware or such configuration may be installed on a computing apparatus such that one or more processors in the computing apparatus perform the technical solutions described in the embodiments of the present invention.

Further, each functional module or each feature of the base station apparatus and the terminal apparatus used in each of the above embodiments may be realized or performed by a circuit, which is typically one or more integrated circuits. Circuits designed to execute each function described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor, or the processor may be a conventional processor, a controller, a microcontroller, or a state machine. The general-purpose processor or each circuit described above may be configured by a digital circuit or may be configured by a logic circuit. Furthermore, with the advance in semiconductor technology, an advanced technology may appear to replace the existing circuit integration technology, and an integrated circuit obtained based on such an advanced technology may also be used by the present invention.

Although the present invention has been described in conjunction with the preferred embodiments of the present invention, it will be understood by those skilled in the art that various modifications, substitutions, and changes may be made therein without departing from the spirit and scope of the present invention. Therefore, the present invention should not be limited by the above-described embodiments but should be limited by the appended claims and their equivalents.

What is claimed is:

1. A method performed by a user equipment (UE), the method comprising:
   determining a first size of a first downlink control information (DCI) format monitored in a common search space (CSS) and a second size of a second DCI format monitored in the CSS;
   determining a third size of the first DCI format monitored in a UE specific search space (USS) and a fourth size of the second DCI format monitored in the USS;
   aligning the first size of the first DCI format with the second size of the second DCI format;
   aligning the third size of the first DCI format with the fourth size of the second DCI format;
   determining at least one of a size of a third DCI format monitored in the USS and a size of a fourth DCI format monitored in the USS; and
   adjusting at least one of the determined size of the third DCI format and the determined size of the fourth DCI format such that the adjusted at least one determined size is not equal to any of the aligned first size, the aligned second size, the aligned third size, or the aligned fourth size.

2. The method according to claim 1, further comprising:
   determining whether a first condition and a second condition are satisfied at a same time, wherein:
   the first condition comprises a total number of sizes of different DCI formats configured for the UE in a cell not exceeding a first number,
   the second condition comprises a total number of sizes of different DCI formats for cell-radio-network temporary identifiers (C-RNTIs) configured for the UE in the cell not exceeding a second number, and
   adjusting the at least one of the determined size of the third DCI format and the determined size of the fourth DCI format comprises adjusting the at least one of the determined size of the third DCI format and the determined size of the fourth DCI format when the first condition and the second condition are satisfied at a same time.

3. The method according to claim 1, further comprising:
   if the first size of the first DCI format monitored in the CSS is smaller than the second size of the second DCI format monitored in the CSS, performing zero padding on the first DCI format monitored in the CSS to align the first size of the first DCI format monitored in the CSS with the second size of the second DCI format monitored in the CSS; and if the first size of the first DCI format monitored in the CSS is larger than the second size of the second DCI format monitored in the CSS, truncating one or more most significant bits at a beginning of a frequency domain resource assignment field of the first DCI format monitored in the CSS to align the first size of the first DCI format monitored in the CSS with the second size of the second DCI format monitored in the CSS.

4. The method according to claim 1, further comprising:

performing zero padding on a smaller one of the first DCI format monitored in the USS and the second DCI format monitored in the USS to align the third size of the first DCI format monitored in the USS with the fourth size of the second DCI format monitored in the USS.

5. The method according to claim 1, further comprising:

performing zero padding on at least one of the third DCI format monitored in the USS and the fourth DCI format monitored in the USS to adjust the at least one of the determined size of the third DCI format monitored in the USS and the determined size of the fourth DCI format monitored in the USS.

6. A method performed by a user equipment (UE), the method comprising:

determining a first size of a first downlink control information (DCI) format monitored in a common search space (CSS) and a second size of a second DCI format monitored in the CSS;

determining a third size of the first DCI format monitored in a UE specific search space (USS) and a fourth size of the second DCI format monitored in the USS;

aligning the first size of the first DCI format with the second size of the second DCI format;

aligning the third size of the first DCI format with the fourth size of the second DCI format;

determining at least one of a size of a third DCI format monitored in the USS and a size of a fourth DCI format monitored in the USS;

determining whether a first condition and a second condition are satisfied at a same time, the first condition being a total number of sizes of different DCI formats configured for the UE in a cell not exceeding a first number, and the second condition being a total number of sizes of different DCI formats for cell-radio-network temporary identifiers (C-RNTIs) configured for the UE in the cell not exceeding a second number;

when the first condition and the second condition are satisfied at a same time:
    adjusting at least one of the determined size of the third DCI format and the determined size of the fourth DCI format such that the adjusted at least one determined size is not equal to any of the aligned first size, the aligned second size, the aligned third size, or the aligned fourth size; and when the first condition and the second condition are not satisfied at the same time:
    forgo adjusting the at least one of the determined size of the third DCI format monitored in the USS and the determined size of the fourth DCI format monitored in the USS, and
    re-determining and re-aligning the third size of the first DCI format monitored in the USS with the fourth size of the second DCI format monitored in the USS, such that the re-aligned third size of the first DCI format monitored in the USS or the re-aligned fourth size of the second DCI format monitored in the USS is equal to the aligned first size of the first DCI format monitored in the CSS or the aligned third size of the first DCI format monitored in the CSS.

7. A user equipment (UE), comprising:

one or more non-transitory computer-readable media storing one or more computer-executable instructions; and at least one processor coupled to the one or more non-transitory computer-readable media and configured to execute the one or more computer executable instructions to:
    determine a first size of a first downlink control information (DCI) format monitored in a common search space (CSS) and a second size of a second DCI format monitored in the CSS;
    determine a third size of the first DCI format monitored in a UE specific search space (USS) and a fourth size of the second DCI format monitored in the USS;
    align the first size of the first DCI format with the second size of the second DCI format;
    align the third size of the first DCI format with the fourth size of the second DCI format;
    determine at least one of a size of a third DCI format monitored in the USS and a size of a fourth DCI format monitored in the USS; and
    adjust at least one of the determined size of the third DCI format and the determined size of the fourth DCI format such that the adjusted at least one determined size is not equal to any of the aligned first size, the aligned second size, the aligned third size, or the aligned fourth size.

8. The UE of claim 7, wherein the at least one processor is further configured to execute the one or more computer-executable instructions to:
    determine whether a first condition and a second condition are satisfied at a same time, wherein:
    the first condition comprises a total number of sizes of different DCI formats configured for the UE in a cell not exceeding a first number,
    the second condition comprises a total number of sizes of different DCI formats for cell-radio-network temporary identifiers (C-RNTIs) configured for the UE in the cell not exceeding a second number, and
    adjusting the at least one of the determined size of the third DCI format and the determined size of the fourth DCI format comprises adjusting the at least one of the determined size of the third DCI format and the determined size of the fourth DCI format when the first condition and the second condition are satisfied at a same time.

9. The UE of claim 7, wherein the at least one processor is further configured to execute the one or more computer-executable instructions to:
    perform zero padding on the first DCI format monitored in the CSS to align the first size of the first DCI format monitored in the CSS with the second size of the second DCI format monitored in the CSS if the first size of the first DCI format monitored in the CSS is smaller than the second size of the second DCI format monitored in the CSS; and
    truncate one or more most significant bits at a beginning of a frequency domain resource assignment field of the first DCI format monitored in the CSS to align the first size of the first DCI format monitored in the CSS with the second size of the second DCI format monitored in the CSS if the first size of the first DCI format monitored in the CSS is larger than the second size of the second DCI format monitored in the CSS.

10. The UE of claim 7, wherein the at least one processor is further configured to execute the one or more computer-executable instructions to:
perform zero padding on a smaller one of the first DCI format monitored in the USS and the second DCI format monitored in the USS to align the third size of the first DCI format monitored in the USS with the fourth size of the second DCI format monitored in the USS.

11. The UE of claim 7, wherein the at least one processor is further configured to execute the one or more computer-executable instructions to:
perform zero padding on at least one of the third DCI format monitored in the USS and the fourth DCI format monitored in the USS to adjust the at least one of the determined size of the third DCI format monitored in the USS and the determined size of the fourth DCI format monitored in the USS.

* * * * *